United States Patent
Hollmann et al.

(10) Patent No.: US 12,312,021 B2
(45) Date of Patent: May 27, 2025

(54) VEHICLE HAVING A SPOILER AND METHOD FOR MOUNTING A SPOILER ON A VEHICLE

(71) Applicant: Bayerische Motoren Werke Aktiengesellschaft, Munich (DE)

(72) Inventors: Falco Hollmann, Garching (DE); Helmut Schaffer, Fuerstenfeldbruck (DE); Bernt Arne Syvertsen, Poing (DE)

(73) Assignee: B ayerische M otoren W erke A ktiengesellschaft, Munich (DE)

( * ) Notice: Subject to any disclaimer, the term of this patent is extended or adjusted under 35 U.S.C. 154(b) by 314 days.

(21) Appl. No.: 17/928,676

(22) PCT Filed: Jun. 28, 2021

(86) PCT No.: PCT/EP2021/067607
§ 371 (c)(1),
(2) Date: Nov. 30, 2022

(87) PCT Pub. No.: WO2022/028775
PCT Pub. Date: Feb. 10, 2022

(65) Prior Publication Data
US 2023/0211835 A1 Jul. 6, 2023

(30) Foreign Application Priority Data
Aug. 7, 2020 (DE) ...................... 10 2020 120 855.3

(51) Int. Cl.
*B62D 35/00* (2006.01)
*B62D 65/16* (2006.01)

(52) U.S. Cl.
CPC .......... *B62D 35/007* (2013.01); *B62D 65/16* (2013.01)

(58) Field of Classification Search
CPC ...... B62D 35/007; B62D 65/16; B62D 27/00; B62D 35/00; F16B 5/128; F16B 11/006; Y02T 10/82
See application file for complete search history.

(56) References Cited

U.S. PATENT DOCUMENTS 8,419,099 B2 * 4/2013 Inoue ....................... B60J 5/107
52/716.5

FOREIGN PATENT DOCUMENTS

DE 10 2004 012 153 A1 10/2005
DE 10 2015 012 874 A1 3/2017
(Continued)

OTHER PUBLICATIONS

JP 5628598 B2 with English translation (Year: 2014).*
(Continued)

*Primary Examiner* — Lori Lyjak
(74) *Attorney, Agent, or Firm* — Crowell & Moring LLP

(57) ABSTRACT

A vehicle has a spoiler fastened to an outer skin component of the vehicle. For this purpose, clip elements are provided on the outer skin component and are in engagement with corresponding mating clip elements of the spoiler. The clip elements have an end stop in a z-direction, which is oriented transversely to the surface of the outer skin component. Between the spoiler and the outer skin component there is an intermediate element, which is elastically compressed in the z-direction and presses the spoiler against the end stop. A method is provided for mounting the spoiler on the vehicle.

11 Claims, 2 Drawing Sheets

(56) References Cited

FOREIGN PATENT DOCUMENTS

DE  10 2018 205 428 A1  10/2019
DE  10 2019 007 206 A1   4/2020
JP        5628598 B2    11/2014

OTHER PUBLICATIONS

DE 102019007206 A1 with English translation (Year: 2020).*
International Search Report (PCT/ISA/210) issued in PCT Application No. PCT/EP2021/067607 dated Sep. 28, 2021 with English translation (five (5) pages).
German-language Written Opinion (PCT/ISA/237) issued in PCT Application No. PCT/EP2021/067607 dated Sep. 28, 2021 (seven (7) pages).
German-language Search Report issued in German Application No. 10 2020 120 855.3 dated Mar. 30, 2021 with partial English translation (10 pages).

* cited by examiner

VEHICLE HAVING A SPOILER AND METHOD FOR MOUNTING A SPOILER ON A VEHICLE

BACKGROUND AND SUMMARY

The invention relates to a vehicle having a spoiler and to a method for mounting a spoiler on a vehicle.

Spoilers are mounted, for example, on the rear edge of a motor vehicle. They influence the aerodynamics of the vehicle, generate negative lift and establish a defined separation edge at the tail end of the vehicle.

Such spoilers are usually fastened on the tail end by means of double-sided adhesive tape. It is thus the case that, for example, the adhesive tape is first of all applied to the spoiler, then a protective layer is peeled off and, using the adhesive tape, the spoiler is adhesively bonded to the tailgate. The mounting operation is time-consuming since the positioning and "activation" of the adhesive tape takes time and generates costs in respect of complex special equipment. In addition, imprecise positioning of the spoiler on the tailgate gives rise to high reworking costs.

DE 10 2015 012 874 A1 discloses the practice of fastening an air-deflecting element on a tailgate via a latching mechanism. For this purpose, a vehicle paneling has latching elements and the air-deflecting element is clipped in by means of corresponding latching elements fitted on the air-deflecting element, as a result of which the air-deflecting element is fastened in a prestressed state on the paneling. Such fastening is problematic for components which are subject to tolerances since, depending on the variance of the component shapes, it is likely to result in defective fixing of the spoiler on the vehicle or excessive prestressing, which can even result in the latching elements failing.

Against this background, the object of the invention is to provide an improved way in which spoilers can be fastened on a vehicle. In particular, the intention is for the mounting operation to be straightforward and for a uniform joint pattern to be ensured.

The object is achieved by a vehicle and a method according to the independent claims. Further advantageous configurations can be gathered from the dependent claims and the following description.

The invention specifies a vehicle having a spoiler, which is fastened on an outer-skin component of the vehicle. For this purpose, clip elements are provided on the outer-skin component, and these clip elements are in engagement with corresponding mating clip elements of the spoiler. In particular, the clip elements and mating clip elements form a form-fitting connection in a z direction, which is directed transversely in relation to the surface of the outer-skin component and, in one configuration, can correspond with a vertical axis of the vehicle. The clip connection can preferably also define a position of the spoiler transverse to the z direction, that is to say in the plane of the outer-skin surface.

The clip elements have an end stop in the z direction and arranged between the spoiler and outer-skin component is an intermediate element, which is elastically compressed in the z direction and pushes the spoiler against the end stop.

In other words, the intermediate element is clamped in, and braced, between the spoiler and the outer-skin component. The compression of the elastic intermediate element builds up a counterpressure, which pushes the spoiler away from the outer-skin component, so that the mating clip elements are pushed in the z direction onto the end stop of the corresponding clip elements. Any tolerances which may be present are compensated for by the intermediate element, which can be compressed to a greater or lesser extent. In this way, a force acting on the clip connection can be limited and uniform fixing is achieved. In addition, the compressed intermediate element results in the spoiler being decoupled from the vehicle.

The provision of the intermediate element establishes an artificial gap between the spoiler and outer-skin component. Slight variations in the height of this gap are less obvious to the human eye than would be the case if there were an abutting edge between the spoiler and outer-skin component. The intermediate element therefore conceals variations over the course of the component from view. Tolerances are less obvious to the customer and the visual appearance is upgraded. As a result, the requirements which have to be met by the tolerance chain can be reduced.

To facilitate mounting, provision can be made, in one configuration, for the intermediate element to be adhesively bonded to the spoiler. The operations of mounting the spoiler and intermediate element can take place at the same time. If the intermediate element is fastened integrally in the spoiler, this prevents the intermediate element from slipping during the operation of mounting the spoiler and ensures that the intermediate element is precisely positioned.

The intermediate element is formed from an elastically compressible material. The intermediate element is preferably formed from a foam material. For example, use can be made of a foamed plastic, in particular a foamed synthetic rubber, e.g. neoprene (chloroprene). If use is made of an elastic foam material, the intermediate element can be easily compressed while, at the same time, having high-level restoring capability from the elastically deformed state. This means that the necessary mounting-operation forces can be kept to a low level and the intermediate element fully achieves gap bridging. A uniform look is obtained since the external appearance of the foam material, even when compressed, does not undergo any significant change.

Cost-effective production along with a high degree of freedom in respect of the look of the spoiler is achieved in one configuration in which the spoiler is a shell component having an outer shell, which forms the visible side of the spoiler, and a lower shell, which is directed toward the vehicle. The outer shell and lower shell are joined to one another, e.g. adhesively bonded to one another, to form the spoiler. The outer shell can be designed, for example, in the form of a fiber-reinforced plastic component and can be made with appearance in mind, e.g. with visible fiber reinforcement made of carbon fibers or colored glass fibers, whereas the lower shell can be made with function in mind. By virtue of the mating clip elements being arranged on or in the lower shell and the intermediate element being fastened on the lower shell, the fastening, in the finished state, is not visible to the customer.

The intermediate element preferably forms a kind of curtain between the spoiler and outer-skin component and conceals or fills the gap which is present there, and this improves the appearance as far as the customer is concerned. For this purpose, in one configuration, the intermediate element can be formed at least along a front and a rear edge of the spoiler. It is, for example, also possible to provide more than one intermediate element, e.g. two strip-form intermediate elements can be arranged with one each running along an edge.

In a further configuration, the intermediate element is designed in the form of an element which runs around the edge. Such an element closes the gap between the spoiler and outer-skin component in relation to all four sides, and this reduces problems relating to dirt and soiling. In addition, an element which runs around the edge, forming a closed structure, is easier to handle and to mount.

The phrasings "runs around the edge" and "along an edge" should be understood here to mean that the intermediate element can run both directly along the edge and at a distance from the same, but essentially parallel to the edge.

In the mounted state, the clip element and mating clip element engage one inside the other, wherein an undercut ensures that separation in the z direction, if possible at all, is only possible if a large amount of force is applied or with the component being damaged as a result. It is possible for the clip elements to be designed, for example, in a pin-like manner and to have, at the end, a mushroom-head-like protrusion, which engages behind the mating clip element. In the simplest case, the mating clip element can be formed by a through-hole in the spoiler. It is, of course, also possible to use other types of clip element and mating clip element.

It is particularly preferred for the mating clip element and clip element to be configured such that, in the mounted state, without an intermediate element, they have a gap in the z direction. In this configuration, the clip and mating clip element engage one inside the other and prevent separation in the direction counter to the mounting-operation direction, but the spoiler and outer-skin component can still be moved closer together. This amount of play can be utilized in order to allow desired expansion of the intermediate element and to effect specific adjustment of a gap size.

The clip elements are arranged on the outer-skin component and fastened thereon. The clip components can preferably be adhesively bonded to the outer-skin component.

In one configuration, the clip elements are adhesively bonded in the form of individual elements to the vehicle, i.e., rather than being connected to one another, the clip elements are adhesively bonded individually to the outer-skin component.

In an alternative configuration, the clip elements are part of a clip rail. Such a rail has a carrier plate, on which a plurality of clip elements are arranged. The clip rail can be formed in one piece, e.g. as an injection molding, so that the clip elements are arranged in fixed position on the rail. It is also possible for the clip elements to be mounted on the carrier plate, e.g. clipped into the same. This type of construction makes it possible to achieve better tolerance compensation and geometric redundancy can be avoided. For the purpose of fastening the clip rail on the vehicle, the carrier plate is then connected, preferably adhesively bonded, to the outer-skin component. This allows a quick mounting operation, since all the clip elements can be mounted in the form of a single component. The positioning of the clip elements on the outer-skin component is less complex since the clip elements are already arranged in the correct position relative to one another.

The clip elements or the clip rail can be adhesively bonded preferably via a liquid adhesive, e.g. a UV-curing adhesive or a single-component or two-component adhesive. The use of a double-sided adhesive tape is also contemplated.

The intermediate element provides for spatial separation between the outer-skin component and spoiler. Direct contact between the two components—with the exception of the region of the clip elements—is prevented, as a result of which corrosion protection is improved. This is advantageous, in particular, when, in one configuration, the spoiler is a fiber-reinforced plastic component and the outer-skin component is a metal component.

The invention also specifies a method for mounting a spoiler on a vehicle. The method contains the following steps:

clip elements are applied at a predetermined position to an outer-skin component of a vehicle, wherein the clip elements have an end stop in a z direction, which is directed transversely in relation to the surface of the outer-skin component, a spoiler is supplied, wherein the spoiler has mating clip elements, which correspond with the clip elements, the clip elements are latched to the mating clip elements of the spoiler, wherein an intermediate element, which is arranged on the spoiler, is elastically compressed in the z direction between the spoiler and outer-skin component and generates a counterpressure, which pushes the spoiler against the end stop.

In a preferred configuration, better tolerance compensation can be achieved and geometric redundancy can be avoided if, for the purpose of applying the clip elements to the outer-skin component, a plurality of clip elements are mounted on a common carrier plate and the carrier plate is adhesively bonded to the outer-skin component.

Features and details described in conjunction with the vehicle also apply in conjunction with the method according to the invention, and vice versa, and therefore reference is or can always be made from one to the other for the disclosure relating to the individual aspects of the invention.

Further advantages, features and details of the invention can be gathered from the following description, in which exemplary embodiments of the invention will be described in detail with reference to the drawings. It is possible here for the features mentioned in the claims and in the description to be essential to the invention in each case individually or in any desired combination. If this application uses the term "can", this relates both to the technical possibility and to the actual technical implementation.

Exemplary embodiments will be explained hereinbelow with reference to the accompanying drawings.

DETAILED DESCRIPTION OF THE DRAWINGS

Figure 1:
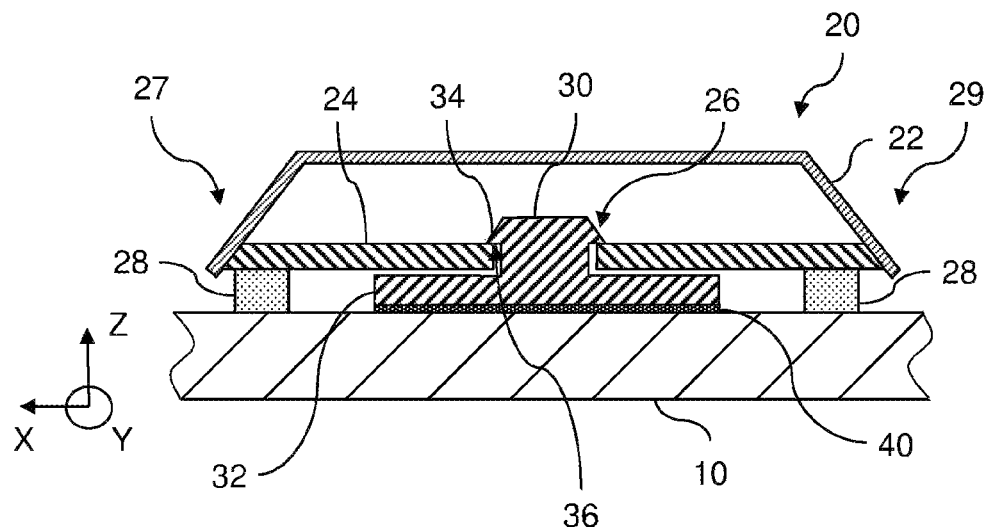
FIG. 1 is a sectional view of a tailgate with a spoiler fastened thereon.

FIG. 1 shows a sectional view of an outer-skin component 10 which is part of a motor vehicle and is in the form of a tailgate. A spoiler 20, also referred to as a Gurney flap, is arranged on the tailgate and fastened on the tailgate 10. The spoiler 20 is designed in the form of a shell component and has an outer shell 22, which forms the outer side of the spoiler 20, which is visible on the vehicle, and also has a lower shell 24, which serves for fastening the spoiler 20 on the vehicle and for stabilizing the spoiler. The outer shell 22 and lower shell 24 are adhesively bonded to one another. The outer shell 22 is preferably designed in the form of a fiber-reinforced plastic component and can have its look enhanced, in particular, by a fiber reinforcement, e.g. using visible carbon fibers or colored glass fibers. The outer shell 22 can be coated, e.g. using a color coating and/or a clear coating.

Figure 2:
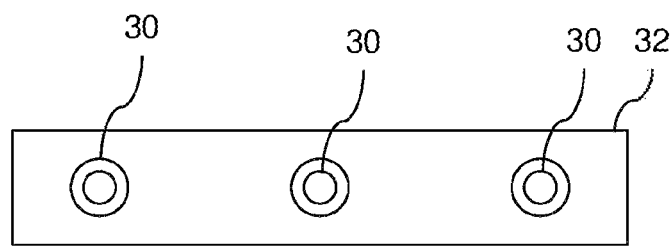
FIGS. 2 and 3 are plan views of exemplary clip elements.
Figure 3:
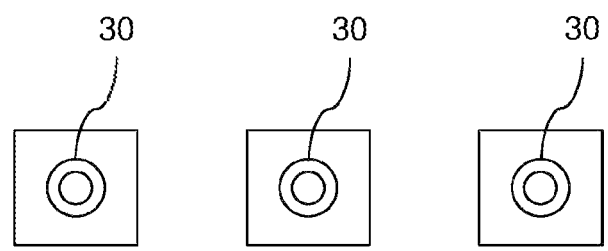

For the purpose of fastening the spoiler, two or more clip elements 30 are adhesively bonded to the outer-skin component. Just one clip element 30 is shown in FIG. 1. Nevertheless, two, or preferably more, clip elements 30 are used in order to fasten the spoiler 20. It is possible for the clip elements 30 to be formed, e.g. as an injection molding, on a common carrier plate 32, see, in this respect, also the plan view in FIG. 2, or to be mounted on the common carrier plate 32. As an alternative, it is also possible for the clip element 30 to be formed as a plurality of individual elements, which are separate from one another and are adhesively bonded to the outer-skin component 10 at a distance apart from one another, see the plan view in FIG. 3.

The spoiler has mating clip elements 26, which correspond to the clip elements 30 in terms of position and shape. In the simplest case, the mating clip elements 26 can be through-holes, which are formed in the lower shell 24. The clip elements 30 are in engagement with the mating clip elements 26, for which purpose a protrusion 34 of the clip elements 30 engages behind the corresponding mating clip element 26 in the manner of an undercut. The shoulder surface of the protrusion here forms an end stop 36 in the z direction, and this prevents the spoiler 20 from being removed from the outer-skin component 10 in the z direction.

An elastically compressible intermediate element 28 is provided at least along the front and rear edges 27, 29, and possibly also all the way around the entire edge, of the spoiler 20 and is adhesively bonded to the lower shell 24. This intermediate element projects from the spoiler 20 in the direction of the outer-skin component 10. The intermediate element 28 is compressed in the z direction between the outer-skin component 10 and the spoiler 20, to be precise the lower shell 24. As a result, the intermediate element 28 generates a counterpressure G in the z direction, which pushes the spoiler 20 away from the outer-skin component 10 and against the end stop 36 of the clip element 30, see, in this respect, FIG. 4.

Figure 4:
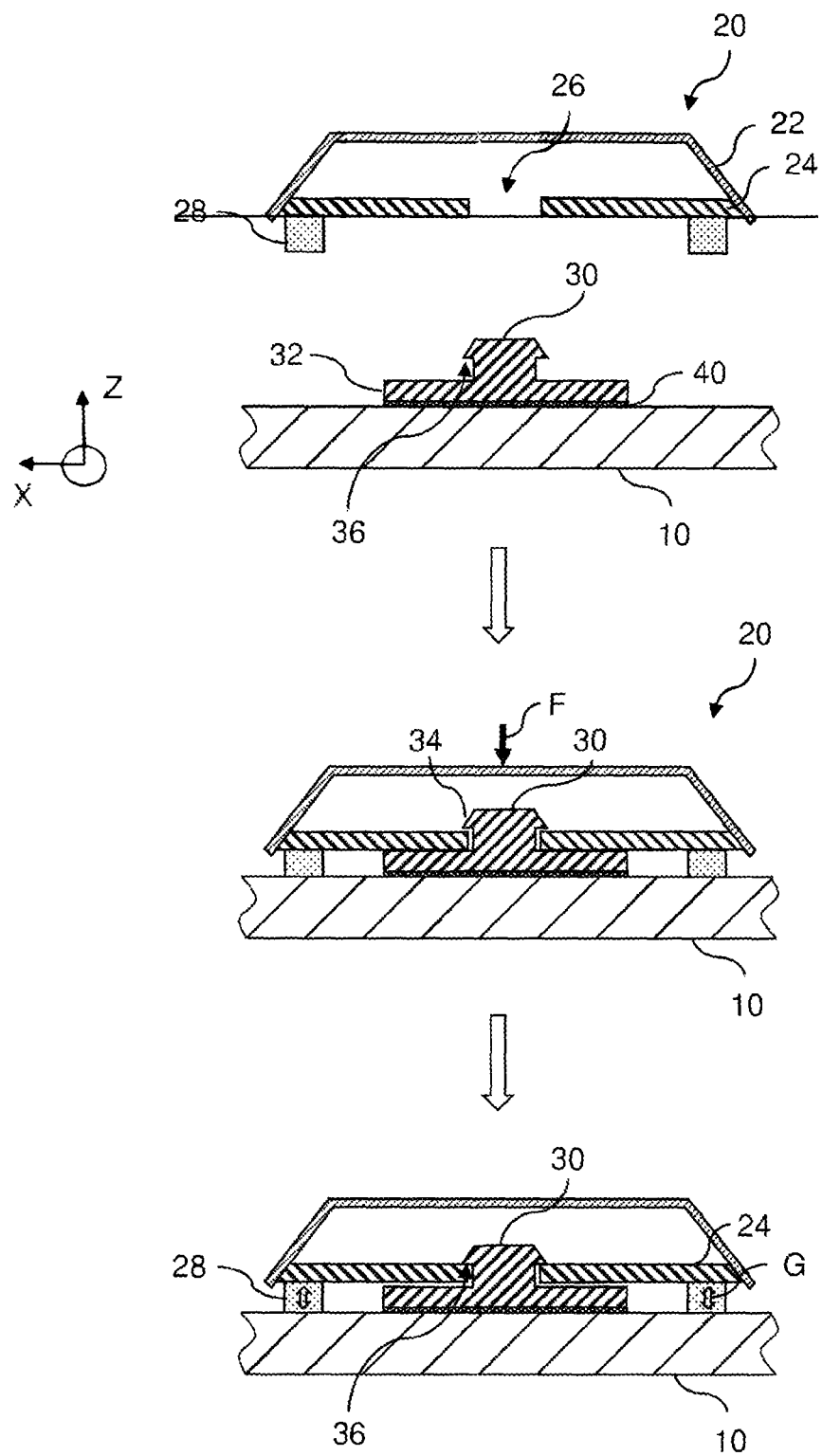
FIG. 4 shows different steps for mounting the spoiler.

FIG. 4 depicts different method steps for mounting the spoiler 20 on the vehicle. First of all, the clip elements 30 are adhesively bonded at a predetermined position, by means of an adhesive-bonding layer 40, to the outer-skin component 10 of the vehicle. This adhesive-bonding layer can be formed, for example, by a liquid/pasty adhesive or a double-sided adhesive tape being applied.

It is also the case that the spoiler 20, which has been described in relation to FIG. 1, is supplied. For the purpose of mounting the spoiler 20, a mounting-operation force F is applied to the spoiler 20 and the spoiler 20 is pushed onto the clip elements 30 along the z direction. The z direction denotes a direction transverse to the surface of the outer-skin component 10. In particular in the case of the example shown, it can coincide with a vertical axis of the vehicle (Z axis); in this case, accordingly, the X axis denotes the longitudinal axis of the vehicle and the Y axis denotes the transverse axis of the vehicle. Once mounting has taken place, the clip elements 30 extend through the mating clip elements 26 or apertures in the lower shell 24 and engage behind the same by way of their protrusions 34. The elastic intermediate element 28, which is arranged on the spoiler 20, is compressed here in the z direction. The clip elements 30 and mating clip elements preferably have an amount of play in the z direction, and therefore the position of the spoiler in the z direction is not yet clearly defined by the clip elements alone.

If the mounting-operation force F is removed once the spoiler has been mounted, then the elastically compressed intermediate element 28 generates a counterpressure force G, by means of which the spoiler 20 is pushed away from the outer-skin component 10 and is pressed, by way of the lower shell 24, onto the end stop 36 of the clip elements 30.

The spoiler 20 assumes a defined position in the z direction. Any tolerances which may be present in the z direction, and can occur in particular at the tailgate or on the outer shell 22, are compensated for as a result.

LIST OF REFERENCE SIGNS

10 Outer-skin component
20 Spoiler
22 Outer shell
24 Lower shell
26 Mating clip element
27 Front edge
28 Intermediate element
29 Rear edge
30 Clip elements
32 Carrier plate
34 Protrusion
36 End stop
F Mounting-operation force
G Counterpressure force
X, Y, Z Directions

The invention claimed is:

1. A vehicle, comprising:
a spoiler;
an outer-skin component of the vehicle;
clip elements provided on the outer-skin component;
mating clip elements of the spoiler, wherein
    the clip elements are in engagement with corresponding ones of the mating clip elements,
    the clip elements have an end stop in a z-direction, which is directed transversely in relation to a surface of the outer-skin component; and
an intermediate element arranged between the spoiler and the outer-skin component, which intermediate element is elastically compressed in the z-direction and pushes the spoiler against the end stop, wherein
    the spoiler is a shell component having an outer shell, which forms a visible side of the spoiler, and a lower shell, which is directed toward the vehicle, and
    the end stop makes contact with a surface of the lower shell.

2. The vehicle according to claim 1, wherein
the intermediate element is adhesively bonded to the spoiler.

3. The vehicle according to claim 1, wherein
the intermediate element is made of a foam material.

4. The vehicle according to claim 1, wherein
the mating clip elements are arranged on or in the lower shell and the intermediate element is fastened on the lower shell.

5. The vehicle according to claim 1, wherein
the intermediate element is formed at least along a front edge and a rear edge of the spoiler.

6. The vehicle according to claim 1, wherein
the intermediate element is configured to run around an edge of the spoiler.

7. The vehicle according to claim 1, wherein
the clip elements are adhesively bonded to the outer-skin component.

8. The vehicle according to claim 1, wherein
the clip elements are arranged on a common carrier plate, which is adhesively bonded to the outer-skin component.

9. The vehicle according to claim 1, wherein
the spoiler is a fiber-reinforced plastic component and the outer-skin component is a metal component.

10. A method for mounting a spoiler on a vehicle, comprising:
applying clip elements at a predetermined position to an outer-skin component of the vehicle, wherein the clip elements have an end stop in a z-direction, which is directed transversely in relation to a surface of the outer-skin component;
providing a spoiler, wherein the spoiler has mating clip elements corresponding to the clip elements;
latching the clip elements to the mating clip elements of the spoiler, wherein an intermediate element, which is arranged on the spoiler, is elastically compressed in the z-direction between the spoiler and the outer-skin component and generates a counterpressure, which pushes the spoiler against the end stop, wherein
the spoiler is a shell component having an outer shell, which forms a visible side of the spoiler, and a lower shell, which is directed toward the vehicle, and
the end stop makes contact with a surface of the lower shell.

11. The method according to claim 10, wherein,
for applying the clip elements to the outer-skin component, mounting a plurality of clip elements on a common carrier plate, and adhesively bonding the carrier plate to the outer-skin component.

\* \* \* \* \*